United States Patent
Ishii

Patent Number: 5,824,892
Date of Patent: Oct. 20, 1998

[54] ACOUSTIC DEVICE FOR MEASURING VOLUME DIFFERENCE

[76] Inventor: Yasushi Ishii, 20-5, Kinuta 8-chome, Setagaya-ku, Tokyo, Japan

[21] Appl. No.: 899,048

[22] Filed: Jul. 23, 1997

[30] Foreign Application Priority Data

Jul. 23, 1996 [JP] Japan ................................ 8-210448

[51] Int. Cl.⁶ ...................................................... G01F 17/00
[52] U.S. Cl. ................................................................. 73/149
[58] Field of Search ................................................. 73/149

[56] References Cited

U.S. PATENT DOCUMENTS

| | | | |
|---|---|---|---|
| 3,113,448 | 12/1963 | Hardway, Jr. et al. | 73/149 |
| 4,112,738 | 9/1978 | Turner | 73/149 |
| 4,474,061 | 10/1984 | Parker | 73/149 |
| 4,561,298 | 12/1985 | Pond | 73/149 |
| 4,640,130 | 2/1987 | Sheng et al. | 73/149 |
| 4,888,718 | 12/1989 | Furuse | 73/149 |
| 5,054,316 | 10/1991 | Pratt et al. | 73/149 |
| 5,105,825 | 4/1992 | Dempster | 73/149 |

FOREIGN PATENT DOCUMENTS

| | | |
|---|---|---|
| 2-33084 | 3/1983 | Japan . |
| 5223616 | 2/1992 | Japan . |
| 6331485 | 5/1993 | Japan . |

*Primary Examiner*—Max H. Noori
*Attorney, Agent, or Firm*—Diller, Ramik & Wight,PC

[57] ABSTRACT

An acoustic device for measuring volume difference between a standard object and an object to be measured comprises a reference container, a measuring container connected to the reference container via a separator, a loudspeaker provided at the separator, for cyclically provides complementary variations in volume to these two containers, microphones for detecting pressure variations inside these respective containers, and a signal processor for measuring a ratio between the magnitude of the detected pressure variation inside the reference container and the magnitude of the detected pressure variation inside the measuring container, and obtaining a difference in volume between the object to be measured and the standard object from the measured ratio when the standard object is placed into the measuring container and the measured ratio when the object to be measured is placed into the measuring container.

8 Claims, 2 Drawing Sheets

ACOUSTIC DEVICE FOR MEASURING VOLUME DIFFERENCE

BACKGROUND OF THE INVENTION

The present invention relates to an acoustic device that precisely measures the difference in the volume of an complex shaped object and the volume of a standard object in a dry state by means of the pressure variation of a gas inside the container into which the objects are placed.

As for the precise weight used to measure mass, the tolerance of the mass of 1 kg of stainless steel, for example, is 0.5 mg. Meanwhile, the volume of this weight is roughly 125 cc, and the buoyancy of the air acting on it is approximately 150 mg weight. Therefore, when shipping this kind of weight, it is necessary to calculate the density of the weight by measuring the volume of that weight to an accuracy of 0.1 percent, and to list on a calibration table the calculated value of the density together with the value of the mass of the weight calibrated by comparing it against a standard weight.

In the past, this type of volume measurement was performed using the Archimedes' method, which involves immersing the weight in water and measuring its buoyancy. However, this method requires complicated operations, beginning with the manufacture of pure water, removing the air bubbles that adhere to the surfaces of the object immersed in the water, measuring the temperature of the water, and cleaning the object after measuring its volume. Industrially speaking, there is frequent demand for measuring not only the weight but the volume of a plurality of objects of the same type and shape. The Archimedes' method is not practical when large numbers of objects are to be measured. In particular, this method cannot be applied to the situations where the object to be measured should not get wet.

In the meantime, there has been one approach to measuring in a dry state the volume of a complex shaped object placed in a container. In this approach, an object of any shape is placed in a container, and variations in volume are effected in the space inside the container by using a loudspeaker or some other sound source so as to adiabatically compress and expand the gas inside the container. The volume of the free space, i.e. the free volume, between the container and the object is found from the magnitude of the variations in pressure inside the container generated at that time, and then the free volume is subtracted from the capacity of the container.

As a measuring instrument of this type, U.S. Pat. No. 4,474,061 (1984) to Parker discloses a device that measures the amount of fuel in a tank. The inventor of the present application, in Japanese Patent Publication (Kokoku) No. 2-33,084 (1990), presented an acoustic volumeter which cyclically provides complementary variations in volume to both a reference container and a measuring container, and, independently of the magnitude of the complementary variations in volume, measures the free volume inside the measuring container from the ratio of the magnitude of the variations in gas pressures, i.e. ratio of the magnitude of the sound pressures, inside these containers generated at that time so as to obtain the volume of an object placed inside the measuring container. U.S. Pat. No. 4,561,298 (1985) to Pond discloses a device that measures the free volume inside a container using a similar method. Further, the inventor of the present application, in Japanese Patent Laid-open (Kokai) No. 5-223,616 (1993), proposed an acoustic volumeter, which, by means of an equalizing pipe provided between the reference container and the measuring container, is not influenced by changes in the constituents of a working medium, such as moisture in the air. U.S. Pat. No. 5,105,825 (1992) to Dempster discloses a device which measures the volume of a human body by using an acoustical method, calculates the density of a human body from the measured volume and the weight of the human body, and then finds the percent of body fat. These inventions are referred to below as conventional inventions. With regard to a method which detects the acoustic leakage of a measuring container using the phase difference of the sound pressure in a reference container and a measuring container, the inventor of the present application presented an acoustic leak tester in Japanese Patent Laid-open (Kokai) No. 6-331,485 (1994).

In the conventional volumeters, the measuring equation that indicates the relation between the volume of an object in the measuring container and the ratio of the magnitude of the sound pressure is determined by a zero setting and a sensitivity setting. The zero setting is to set the point of origin of the volume measurement in accordance with the ratio of the magnitude of the sound pressure when the volume of the object is zero, that is, when the measuring container is empty, and the sensitivity setting is to set the gradient of the measuring equation in accordance with the ratio of the magnitude of the sound pressure when a standard object of known volume is placed into the measuring container. Therefore, in the conventional volumeters, in order to exclude the influence such as a drift of the characteristics of the two microphones which detect sound pressure inside the reference container and measuring container so as to ensure the precision of the volume measurement, the two operations described above must be performed often during the intervals between measurements.

In measuring the volume of a weight described above, if the difference in volume between a weight to be measured and a standard weight of the same type can be measured by comparing these weights, it is possible to obtain the volume of the weight to be measured from this volume difference and the volume of the standard weight that has been found in advance using a known method such as Archimedes' method. The same holds true for the measurement of the volume of other industrial products as well, in that by using one of a plurality of objects of the same type can be used as a standard object for comparison, the volume of other objects can be obtained by simply finding the volume difference between the standard object and other objects.

SUMMARY OF THE INVENTION

With the foregoing in view, an object of the present invention is to provide an acoustic device for measuring volume difference between a standard object and an object to be measured that uses a measuring equation in which the origin of the volume measurement is the state where a standard object is placed in a measuring container, and finds the volume difference between an object to be measured and the standard object from the ratio of the magnitude of the sound pressures inside the reference container and the measuring container when a standard object is placed inside the measuring container, and the ratio of magnitude of the sound pressures when the standard object is replaced by the object to be measured.

To achieve the object of the present invention, an acoustic device for measuring volume difference between a standard object and an object to be measured comprises a reference container; a measuring container connected to the reference container by way of a separator; volume changing means for cyclically providing complementary volume variations to the reference container and the measuring container; pressure equalizing means for equalizing static pressure inside the reference container and static pressure inside the measuring container; pressure variation detecting means for detecting pressure variations inside the reference container and the measuring container; and a signal processor for measuring a ratio between the magnitude of the detected pressure variation inside the reference container and the magnitude of the detected pressure variation inside the measuring container, and obtaining a difference in volume between the object to be measured and the standard object from the measured ratio when the standard object is placed into the measuring container and the measured ratio when the object to be measured is placed into the measuring container.

As with measuring the volume of a weight, when the object to be measured and the standard object are the same type of object, the difference in volume between these objects is at the highest around several percent of the volume of the object to be measured. When this volume difference is measured using the device of this present invention, since the volume difference is small, the error in the gradient of the measuring equation does not exert a great influence on the volume measurement value of the object to be measured, which is determined from the volume difference and the volume of the standard object. Therefore, the sensitivity setting need only be made one time prior to the measurement, and thereafter, only the zero setting needs to be made between measurements.

DETAILED DESCRIPTION OF THE EMBODIMENTS

Figure 1:
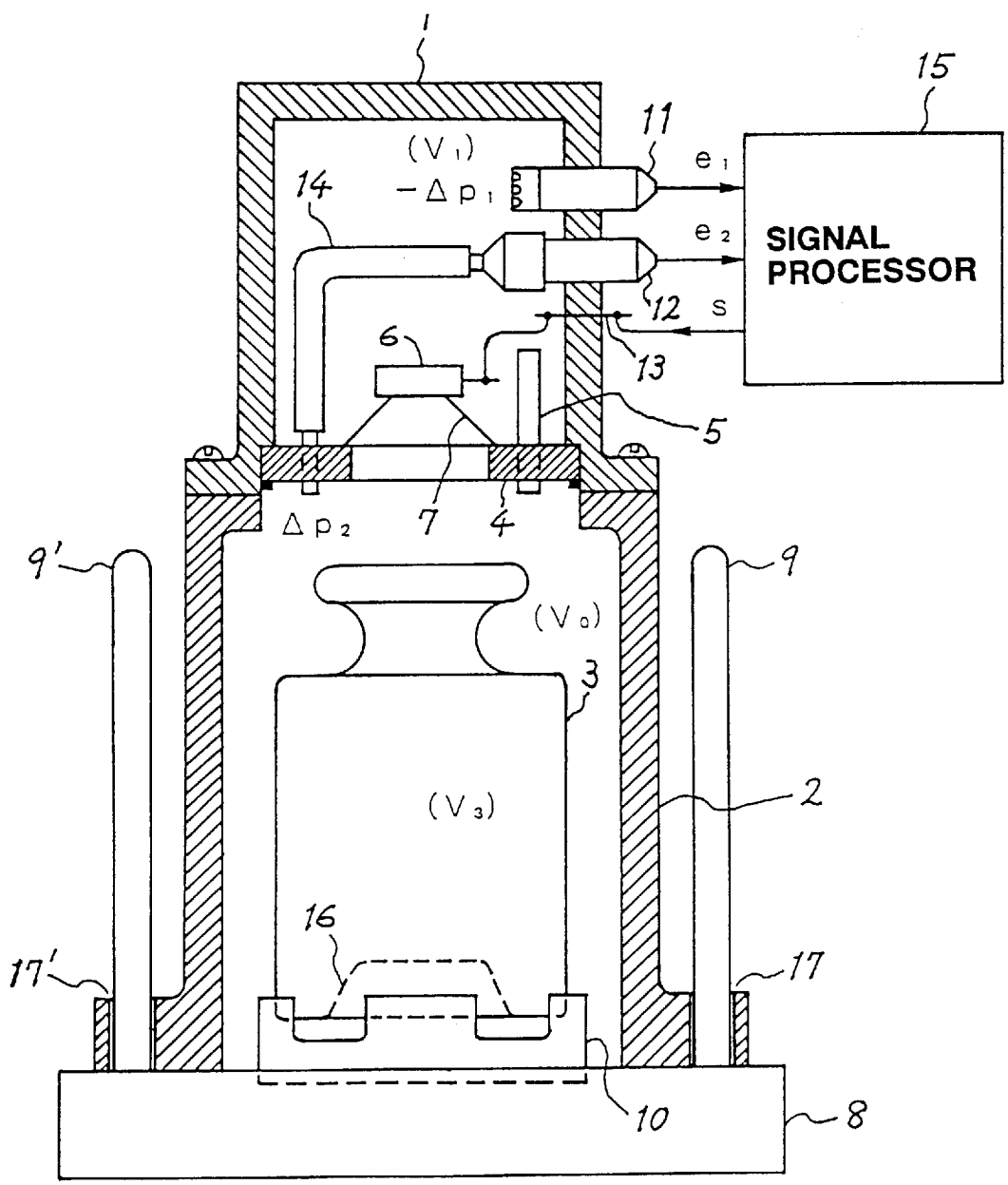
FIG. 1 is a diagram illustrating a device for measuring the volume difference of weights that is an embodiment of the an acoustic device for measuring volume difference between a standard object and an object to be measured according to the present invention.

Referring to FIG. 1, an embodiment of an acoustic device for measuring volume difference of the present invention comprises a reference container 1 having the capacity $V_1$, and a measuring container 2. A weight 3 having the volume of $V_3$ sits on a stand 10 placed in the center of a base plate 8. The measuring container 2 that is connected to the reference container by way of a below-mentioned separator covers this weight 3. The volume of the free space $V_2$ between the measuring container 2 and the weight 3 can be expressed as:

$$V_2 = V_0 - V_3 \quad (1)$$

where $V_0$ is the internal capacity of the measuring container 2 in a state wherein the stand 10 remains and the weight 3 is removed.

In the bottom of the measuring container 2, guide holes 17,17' are formed. Guide rods 9,9' are fixed to the base plate 8 and penetrate the guide holes 17,17' when the measuring container 2 covers the weight 3 so as to prevent the inside surface of the measuring container 2 from coming in contact with the weight 3. The stand 10 positions the weight 3 almost exactly in the center of the base plate 8, and functions to keep the base of the weight 3 elevated with a cavity 16 so that the variations in pressure inside the measuring container sufficiently enters the cavity 16 in the base of the weight 3.

The insides of the reference container 1 and the measuring container 2 are partitioned by a separator 4 affixed to the bottom of the reference container 1. The separator 4 has attached to it a loudspeaker 6, and an equalizing pipe 5 for communicating the spaces inside the reference container 1 and the measuring container 2 so that the static pressure of the gas inside the reference container 1 and measuring container 2 is equalized by passing through the equalizing pipe 5. As an attendant function, the equalizing pipe 5 also serves to homogenize the constituents of the gas inside the reference container 1 and the measuring container 2, such as air humidity, for instance.

Microphones 11 and 12 are mounted to the wall of the reference container 1 as means of detecting variations in pressure. Pressure variations inside the reference container 1 are detected by the microphone 11 and become a microphone signal $e_1$. Meanwhile, pressure variations inside the measuring container 2 are communicated to the microphone 12 via a flexible tube 14, where they are detected and converted into a microphone signal $e_2$. The signals $e_1$ and $e_2$ are input into a signal processor 15, where signal processing and calculations are performed for volume measurement. Further, the signal processor 15 generates a cyclic speaker driving signal s, which is fed to the loudspeaker 6 via a terminal 13, causing a vibrating plate 7 of the loudspeaker 6 to vibrate. Consequently, complementary variations in volume are cyclically provided by the front and back surfaces of the vibrating plate 7 to the spaces inside the reference container 1 and the measuring container 2.

When the speaker driving signal s drives the speaker and the vibrating plate 7 is thrust out, the free volume $V_2$ inside the measuring container 2 is compressed by a microvolume $\Delta V_S$, and the capacity $V_1$ of the reference container is expanded by the microvolume $\Delta V_S$. Further, when a gas of microvolume $\Delta V_P$ flows into the measuring container 2 via the equalizing pipe 5, the microvolume gas $\Delta V_P$ flows out of the reference container 1 through the equalizing pipe 5. When this happens, the variations in pressure generated inside the reference container 1 and the measuring container 2 are expressed as $-\Delta P_1$ and $\Delta P_2$, respectively.

$$\text{When } \Delta V = \Delta V_S + \Delta V_P \quad (2)$$

then based on the relational expression for the adiabatic change of gas, we get $$\Delta P_1/P_0 = \gamma \Delta V/V_1 \quad (3)$$

$$\Delta P_2/P_0 = \gamma \Delta V/V_2 \quad (4)$$

where $P_0$ is the average static pressure of the gas inside the reference container 1 and measuring container 2, and $\gamma$ is the specific heat ratio of the gas inside the containers, which, for air, is roughly 1.4.

From the two equations cited above, we obtain the following two relationships:

$$\Delta P_1/\Delta P_2 = V_2/V_1 \quad (5)$$

$$V_2 = V_1(\Delta P_1/\Delta P_2) \quad (6)$$

In the above equation, $V_1$ is the capacity of the reference container, and therefore a fixed value. Consequently, the free volume $V_2$ and the ratio of the magnitude of the two pressure variations ($\Delta P_1/\Delta P_2$) are proportional to one another.

Further, from equations 1 and 6, the volume $V_3$ of the weight 3 can be expressed as $$V_3 = V_0 - V_1(\Delta P_1/\Delta P_2) \tag{7}$$

In the above equation, $V_0$ is the volume of the measuring container 1, and this is also a fixed value.

Figure 2:
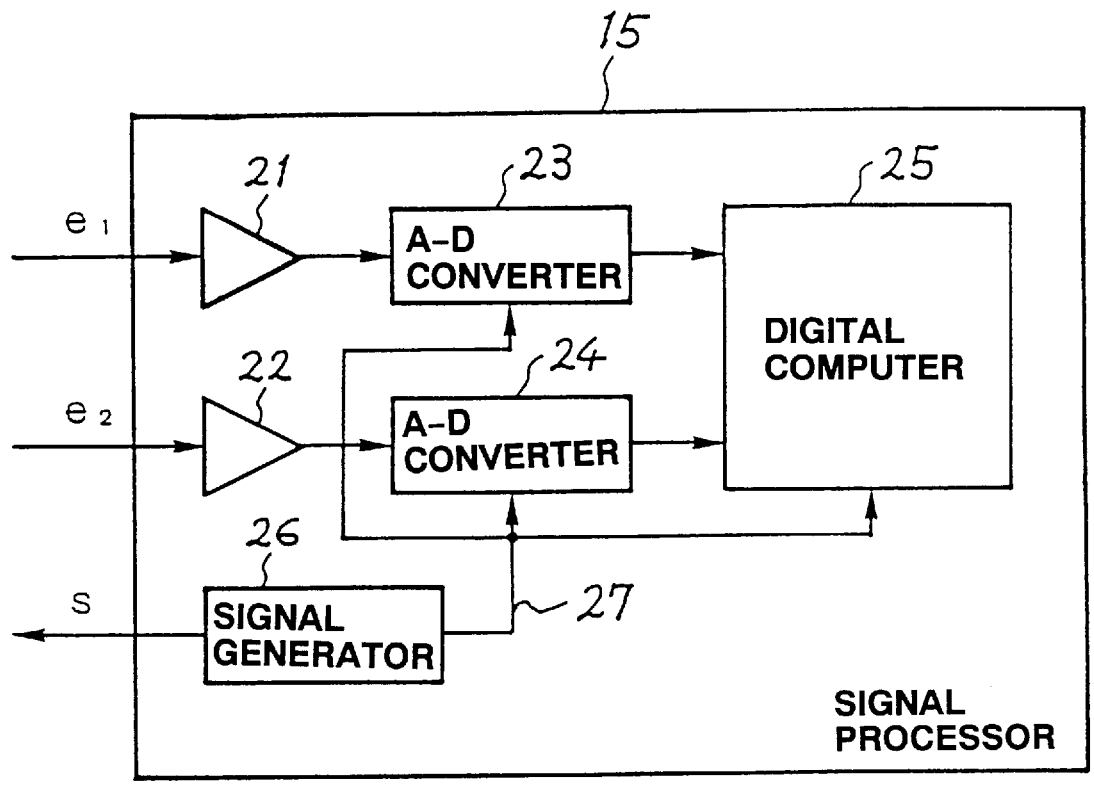
FIG. 2 is a block diagram showing an example of the configuration of the signal processor depicted in FIG. 1.

FIG. 2 depicts an example of the configuration of the signal processor 15. The output signals $e_1$ and $e_2$ from the microphones 11, 12 are amplified by amplifiers 21 and 22, and then, are converted into digital values by analog-to-digital (A–D) converters 23 and 24 which are input to a digital computer 25. A signal generator 26 generates a speaker driving signal s and feeds it to the loudspeaker 6, and also generates a synchronizing pulse and feeds it to the A–D converters 23, 24 and digital computer 25 via a lead wire 27. The above-described input of data to the A–D converters 23, 24 and the computer 25 is synchronized by this synchronizing pulse.

When the cyclic signal s that drives the loudspeaker 6 is a sine wave signal, the output signals $e_1$, $e_2$ of the microphones 11, 12 are also sine wave signals. The digital computer 25 inputs a predetermined number of the sampled values from these signals, performs Fourier transformations on the input values, precisely measures amplitudes $E_1$ and $E_2$ of the signals $e_1$ and $e_2$. The magnitude of pressure variations $\Delta P_1$ and $\Delta P_2$ is expressed by the measured amplitudes $E_1$ and $E_2$.

The ratio of the magnitudes of the two pressure variations is expressed using the ratio R of the amplitudes.

$$R = E_1/E_2 = K(\Delta P_1/\Delta P_2) \tag{8}$$

where K is a constant that represents the ratio of the sensitivity between the microphones 11, 12. By using R, the relation expressed in equation 7 becomes as follows:

$$V_3 = V_0 - V_1 R/K \tag{9}$$

The speaker driving signal s is not limited to sine wave signals, but triangular wave signals and rectangular wave signals can also be used. In such cases, the microphone signals $e_1$, $e_2$ also become triangular or rectangular wave signals, and the above-mentioned Fourier transformation is equivalent to passing the signals $e_1$, $e_2$ through a narrow band digital filter, in which the harmonic components contained in the triangular wave signal and rectangular wave signal waveforms are removed, and $E_1$ and $E_2$ become the amplitudes of the fundamental component. The average of the absolute value of the signal waveform obtained by rectifying these signals $e_1$ and $e_2$ rather than their amplitudes can also be used as the value that expresses the magnitude of these signals.

Now, in FIG. 1, if the amplitude ratio R is $R_X$ when the weight 3 serves as a weight to be measured having a volume $V_X$, equation 9 becomes as follows:

$$V_X = V_0 - V_1 R_X/K \tag{10}$$

Similarly, if the amplitude ratio R is $R_S$ when the weight 3 serves as the standard weight having volume $V_S$, equation 9 becomes as follows:

$$V_S = V_0 - V_1 R_S/K \tag{11}$$

Therefore, the volume difference between the weight to be measured and the standard weight can be expressed as:

$$V_X - V_S = V_1(R_S - R_X)/K \tag{12}$$

The above equation expresses the relation between the volume difference $V_X - V_S$ and the amplitude ratio $R_X$, and is the measuring equation for the device of the present invention. In the digital computer 25, this equation can be used to calculate $V_X - V_S$ from $R_X$. With the above equation, the volume of the object to be measured $V_X$ cannot be measured directly as in conventional devices, but rather, when $V_X$ needs to be known, that value can be found from the measured volume difference $V_X - V_S$ and the volume of that standard object $V_S$ using a different equation. On the other hand, with the conventional devices, the volume of an object $V_X$ can be found directly by subtracting the free volume $V_2$ from the capacity of the measuring container.

Figure 3:
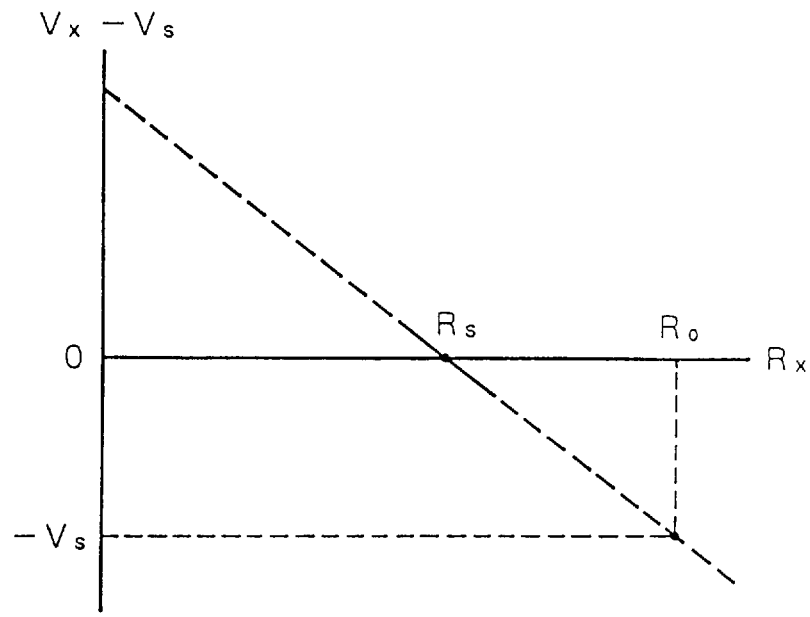
FIG. 3 is a graph of the measuring equation for the device of the present invention.

FIG. 3 depicts a graph of equation 12. The coefficient $V_1/K$ that expresses the gradient of this graph is determined using the sensitivity setting performed prior to measuring of the volume difference. Specifically, first, a standard weight is placed into the measuring container 2, the amplitude ratio $R_S$ is then measured and that value is stored in the digital computer as the point of origin of measurement. Next, additional volume is provided by placing a small object with a known volume on top of the standard weight inside the measuring container, and the amplitude ratio is measured just like before. These two operations determine two points on the graph, thus determining equation 12.

Normally, the volume of a standard weight $V_S$ is known, in which case, the sensitivity setting can be made using the standard weight alone without need for the small object mentioned above. Specifically, first, a standard weight is placed into the measuring container 2, the value of the amplitude ratio $R_S$ is measured and stored, and then, the standard inside the measuring container is removed, and the value of the amplitude ratio $R_O$ at that time is measured. In this way, as seen in FIG. 3, the gradient $V_1/K$ in equation 12 can be determined using the following equation.

$$V_1/K = V_S/(R_O - R_S) \tag{13}$$

Following the above procedure, the weight to be measured is placed into the measuring container 2, and the amplitude ratio $R_X$ is measured. The resultant value is entered into equation 12 to find the volume difference $V_X - V_S$. If the value of the volume of the standard weight $V_S$ is stored in the digital computer 25 in advance, the value of the volume of the weight to be measured $V_X$ can be calculated by adding $V_S$ to the above-described volume difference. The volume ratio $V_X/V_S$, etc. can also be calculated.

As described above, when the volume difference to be measured $V_X - V_S$ is within several percent of the volume $V_X$, the portion of the graph shown in FIG. 3 that is used in the measurement is a small range in the vicinity of the point of origin $R_S$ that is indicated by a solid line. Thus, even if the gradient of the measuring equation is changed by one percent due to the drift of the microphone characteristics, etc., giving rise to a one percent error in the measurement value of the volume difference, this only results in a less than 0.1 percent error for the volume of the weight to be measured. Therefore, the sensitivity setting, which sets the measuring equation gradient, need only be performed one time at the start of the measurement. For the drift of the microphone characteristics, etc., the only procedure that needs to be carried out is the zero setting between measurements, which involves placing the standard weight into the measuring container, finding the amplitude ratio and resetting the value of the point of origin $R_S$ of the measurement.

With the device of the present invention depicted in FIG. 1, pressure variations (sound pressure) of $-\Delta P_1$ and $\Delta P_2$ of opposite signs are generated inside the reference container 1 and the measuring container 2, respectively. Therefore, the microphone signals $e_1$ and $e_2$ exhibit a 180 degree phase difference therebetween. In other expressions, supposing that t represents time and f represents the speaker driving frequency, and the microphone signals $e_1$ is expressed as follows;

$$e_1(t) = -E_1 \sin 2\pi f t \tag{14}$$

then, the microphone signal $e_2$ is expressed as follows:

$$e_2(t) = E_2 \sin 2\pi f t \tag{15}$$

However, should the presence of dirt or the like creates a gap between the measuring container 2 and the base plate 8, the viscosity of the gas entering and exiting through this gap gives rise to sound energy loss, with the result that the phase of the signal $e_2$ advances slightly relative to the signal $e_1$, which is expressed as follows.

$$e_2(t) = E_2 \sin (2\pi f t + \theta) \tag{16}$$

If the measuring container 2 is not acoustically sealed and allows acoustic leakage, errors will occur in the volume difference measurement value. However, by measuring the above-mentioned phase shift $\theta$, it is possible to sense the magnitude of the gap, i.e. the acoustic leakage of the measuring container, and to determine whether or not the measurement was performed correctly.

As described above, the waveforms of the microphone signals $e_1$, $e_2$ are subjected to Fourier transformation by the digital computer 25. The results of the Fourier transformation are complex numbers, the absolute value of the complex numbers being the amplitudes $E_1$, $E_2$ of the signals $e_1$, $e_2$, and the arguments of the complex numbers being the phase angles of the signals $e_1$, $e_2$. Therefore, the Fourier transformation makes it possible to find the phase difference between the signals $e_1$, $e_2$, which is used to sense the above-mentioned acoustic leakage of the measuring container.

The preceding has explained the structure, principle and operation of the device of the present invention using embodiments for volume measurements of weights. However, the object to be measured by the present invention is not limited to weights. Further, as mentioned at the outset of the description, the device of the present invention is especially effective when used in comparative measurements of the volumes for a large number of objects of the same type.

What is claimed is:

1. An acoustic device for measuring the small difference between the volume of an object to be measured and the volume of a standard object which is approximately the same as the volume of the object to be measured, comprising:

a reference container;

a measuring container connected to the reference container by way of a separator;

volume changing means for cyclically providing complementary volume variations to the reference container and the measuring container;

pressure equalizing means for equalizing static pressure inside the reference container and static pressure inside the measuring container;

pressure variation detecting means for detecting pressure variations inside the reference container and the measuring container; and signal processor means for measuring a ratio between the magnitude of the detected pressure variation inside the reference container and the magnitude of the detected pressure variation inside the measuring container, and obtaining a difference in volume between the object to be measured and the standard object from a difference of the measured ratio when the standard object is placed into other measuring container and the measured ratio when the object to be measured is placed into the measuring container.

2. The device as set forth in claim 1, further comprising means for measuring a difference in phase between the detected pressure variation inside the reference container and the detected pressure variation inside the measuring container, and for detecting acoustic leakage of the measuring container by using the measured difference in phase.

3. The device as set forth in claim 1, wherein the measuring container comprises:

a base plate provided with guide rods extending vertically and upwardly therefrom, for placing the standard object or the object to be measured thereon; and a container cover formed with guide holes in a bottom portion thereof at positions corresponding to the guide rods such that the container cover is placed over the base plate by fitting the guide rods of the base plate into the guide holes.

4. The device as set forth in claim 1, wherein the volume changing means comprises a loudspeaker provided at the separator.

5. The device as set forth in claim 1, wherein the pressure equalizing means comprises an equalizing pipe that passes through the separator.

6. The device as set forth in claim 1, wherein the pressure variation detecting means comprises microphones.

7. The device as set forth in claim 1, wherein the signal processor means includes a digital computer.

8. The device as set forth in claim 7, wherein the digital computer includes means for storing the value of the volume of the standard object and adding the value of the stored volume of the standard object to the obtained difference in volume between the object to be measured and the standard object so as to obtain the volume of the object to be measured.

* * * * *

UNITED STATES PATENT AND TRADEMARK OFFICE
CERTIFICATE OF CORRECTION

PATENT NO. : 5 824 892
DATED      : October 20, 1998
INVENTOR(S): Yasushi ISHII

It is certified that error appears in the above-indentified patent and that said Letters Patent is hereby corrected as shown below:

IN THE CLAIMS:

Claim 1, 3rd line from the bottom, "other" should read -- the --.

Signed and Sealed this

Twenty-fifth Day of May, 1999

Attest:

Q. TODD DICKINSON

*Attesting Officer*                *Acting Commissioner of Patents and Trademarks*